United States Patent
Sugiyama

(10) Patent No.: US 10,527,923 B2
(45) Date of Patent: Jan. 7, 2020

(54) SCANNING PROJECTOR TRANSMISSIVE SCREEN, AND SCANNING PROJECTOR SYSTEM

(71) Applicant: YAZAKI CORPORATION, Tokyo (JP)

(72) Inventor: Tetsuya Sugiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/891,180

(22) Filed: Feb. 7, 2018

(65) Prior Publication Data
US 2019/0243229 A1    Aug. 8, 2019

(51) Int. Cl.
*G03B 21/625* (2014.01)
*G02B 27/01* (2006.01)
*H04N 9/31* (2006.01)

(52) U.S. Cl.
CPC ........ *G03B 21/625* (2013.01); *G02B 27/0101* (2013.01); *G02B 2027/0118* (2013.01); *G02B 2027/0123* (2013.01); *H04N 9/3102* (2013.01); *H04N 9/3129* (2013.01)

(58) Field of Classification Search
CPC . G03B 21/625; G02B 27/0101; H04N 9/3129
USPC ....................................................... 359/630
See application file for complete search history.

(56) References Cited

U.S. PATENT DOCUMENTS

| | | | |
|---|---|---|---|
| 4,721,361 A | 1/1988 | van de Ven | |
| 5,704,061 A * | 12/1997 | Anderson | G02B 27/06 396/330 |
| 6,094,309 A * | 7/2000 | Ophey | G02B 27/0037 359/618 |
| 6,729,730 B2 * | 5/2004 | Ito | G02B 21/34 349/9 |
| 6,927,917 B2 * | 8/2005 | Kimura | G02B 26/124 359/206.1 |
| 6,947,212 B2 | 9/2005 | Karasawa et al. | |
| 7,158,298 B2 | 1/2007 | Miyata et al. | |
| 9,395,541 B2 | 7/2016 | Fujikawa et al. | |
| 2001/0050811 A1 | 12/2001 | Miyata | |
| 2003/0047666 A1 | 3/2003 | Alden | |
| 2005/0052617 A1 | 3/2005 | Fujikawa et al. | |
| 2005/0117213 A1 | 6/2005 | Honda et al. | |
| 2014/0036374 A1 | 2/2014 | Lescure et al. | |
| 2015/0362734 A1 | 12/2015 | Moser et al. | |
| 2016/0085084 A1 | 3/2016 | Masson et al. | |
| 2016/0147074 A1 | 5/2016 | Kobayashi et al. | |

(Continued)

FOREIGN PATENT DOCUMENTS

CN    1485688 A    3/2004
CN    104345458 A    2/2015
(Continued)

OTHER PUBLICATIONS

Chinese Office Action for the related Chinese Patent Application No. 201610920435.7 dated Mar. 26, 2018.
(Continued)

*Primary Examiner* — Christopher E Mahoney
(74) *Attorney, Agent, or Firm* — Kenealy Vaidya LLP

(57) ABSTRACT

There is provided a scanning projector transmissive screen having a first surface on which a microlens array is formed, and a second surface formed into a single lens shape.

2 Claims, 7 Drawing Sheets

(56) References Cited

U.S. PATENT DOCUMENTS

| | | |
|---|---|---|
| 2016/0266283 A1 | 9/2016 | Segawa |
| 2017/0115553 A1* | 4/2017 | Sugiyama ............ G03B 21/625 |
| 2017/0160543 A1* | 6/2017 | Sugiyama .......... G02B 27/0101 |

FOREIGN PATENT DOCUMENTS

| | | |
|---|---|---|
| JP | S52-005555 Y | 2/1977 |
| JP | 58058517 A | 4/1983 |
| JP | S58-058517 A | 4/1983 |
| JP | 2004-258071 A | 9/2004 |
| JP | 2005-037496 A | 2/2005 |
| JP | 2007-8052 A | 1/2007 |
| JP | 2007-17710 A | 1/2007 |
| JP | 2007-286348 A | 11/2007 |
| JP | 2010-145924 A | 7/2010 |
| JP | 2013-246236 A | 12/2013 |
| JP | 2015-059969 A | 3/2015 |
| JP | 2016-045385 A | 4/2016 |

OTHER PUBLICATIONS

Japanese Office Action for the related Japanese Patent Application No. 2015-207891 dated Apr. 3, 2018.
Chinese Office Action for the related Chinese Patent Application No. 201610920435.7 dated Sep. 25, 2018.

* cited by examiner

X-X CROSS SECTION

Y-Y CROSS SECTION

SCANNING PROJECTOR TRANSMISSIVE SCREEN, AND SCANNING PROJECTOR SYSTEM

BACKGROUND

Technical Field

The present invention relates to a scanning projector transmissive screen.

Related Art

A scanning projector combines laser beams of R, G and B colors subjected to brightness modulation into one beam, and makes them scan on a screen in synchronization with the brightness modulation to form a two-dimensional image on the screen. The scanning projector has a characteristic feature that it is easy to provide high resolution, downsizing and low power consumption compared to a method of projecting two-dimensional images.

By virtue of these characteristic features, the scanning projector is used in practice in an in-vehicle head-up display. Here, the head-up display is a device which displays information such that the information is superposed on a background ahead of a line of sight.

FIG. 6 is a schematic diagram showing an exemplary configuration of a conventional in-vehicle head-up display in which a scanning projector is used. As shown in FIG. 6, the head-up display includes a scanning projector 400, a transmissive screen 300, a field lens 310, a magnifying glass 320 and a windshield 330.

The transmissive screen 300 is a transparent or semitransparent member formed into a rectangular shape, and is provided with microlens arrays 301 composed of multiple microlenses formed on a surface of the transmissive screen 300 at a side of the scanning projector 400. This is to widen a viewing angle by widening a beam transmitting through the transmissive screen 300.

An image (i.e., an intermediate image) projected on the transmissive screen 300 by the scanning projector 400 is entered into a magnifying glass 320 via the field lens 310. Further, the image is reflected on the magnifying glass 320, and is projected onto the windshield 330 and recognized by driver's eyes located in an eye box. Here, in place of the windshield 330, a transmissive screen mechanism which is referred to as a combiner, may be provided separately to project images.

As shown in FIG. 7A, the light emitted from the scanning projector 400 scans a predetermined angle range. The light having entered the transmissive screen 300 is diffused due to the microlens arrays 301, and a diffusion direction of the light is influenced by an incident angle of the light with respect to the transmissive screen 300. That is, for the light entering at a center portion in a scanning direction, the light enters perpendicularly with respect to the screen 300 and thus it diffuses around the perpendicular direction. However, the incident angle becomes larger towards an end portion of the screen, thus a traveling direction of the diffused light is spread outwards. Consequently, without any measures, the light arriving to the magnifying glass 320 decreases at an end portion of an image, causing a decrease in brightness at the end portion of the image recognized in the eye box.

A diffusion range of the light can be adjusted by changing a curvature of the microlens; however, inhomogeneity of the brightness at the center portion and the end portion cannot be resolved. Hence, to address this problem, the field lens 310 is positioned near the light emission side of the transmissive screen 300 to change the traveling direction of the diffused light at the end portion to be inward, as illustrated in FIG. 7B. Consequently, the images which are entirely clear can be recognized in the eye box.

Patent Literature 1: JP 2010-145924 A

SUMMARY

Since a display device using the scanning projector, in particular the head-up display, is configured to project images on the windshield, a projecting unit for performing the projection needs to be housed in a dashboard and such of a vehicle. Meanwhile, a driving mechanism such as a handle and display mechanisms such as a meter and a warning light are arranged inside the dashboard, and thus an installation space for the projector unit is very limited. Consequently, it is preferable that the number of components included in the display device using the scanning projector is small.

As described above, by disposing the field lens 310 near the transmissive screen 300 on which the microlens arrays are formed, it is possible to obtain the images which are entirely clear. However, this results in an increase in the number of components, which is not preferable in view of a size of a housing and an increase in the cost.

It is therefore an object of the present invention to provide a display device using a scanning projector which can obtain images which are entirely clear without increasing the number of components.

To solve the above problem, a scanning projector transmissive screen according to the present invention includes a first surface on which a microlens array is formed, and a second surface formed into a single lens shape. Light that has emitted from the scanning projector and then entered to the transmissive screen for the scanning projector is diffused inside the transmissive screen in a traveling direction corresponding to an incident angle due to the microlens arrays formed on an incident surface. That is, for the light perpendicularly entering to a central portion of the transmissive screen, the light is diffused around the perpendicular direction, but as it gets closer to an end portion of the transmissive screen, the traveling direction of the diffused light spreads outward. The traveling direction of the diffused light is changed to more inward as it gets closer to the end portion by a function of a single lens formed on an emission surface when the diffused light is emitted from the transmissive screen. That is, the transmissive screen for the scanning projector according to the present invention has functions of both of the conventional transmissive screen and a lens arranged near the conventional transmissive screen. Consequently, there is no need to provide a separate lens, thereby reducing the number of components. The single lens shape may form a convex lens. Consequently, the traveling direction of the diffused light can be changed to inward as it gets closer to the end portion. In this case, the single lens shape may form a Fresnel lens. Consequently, thickness of the transmissive screen can be reduced. The single lens shape may forma concave lens. Consequently, the traveling direction of the diffused light can be changed to outward as it gets closer to the end portion.

According to the present invention, there is provided a display device using a scanning projector which can obtain images which are entirely clear without increasing the number of components.

DETAILED DESCRIPTION

Figure 1:
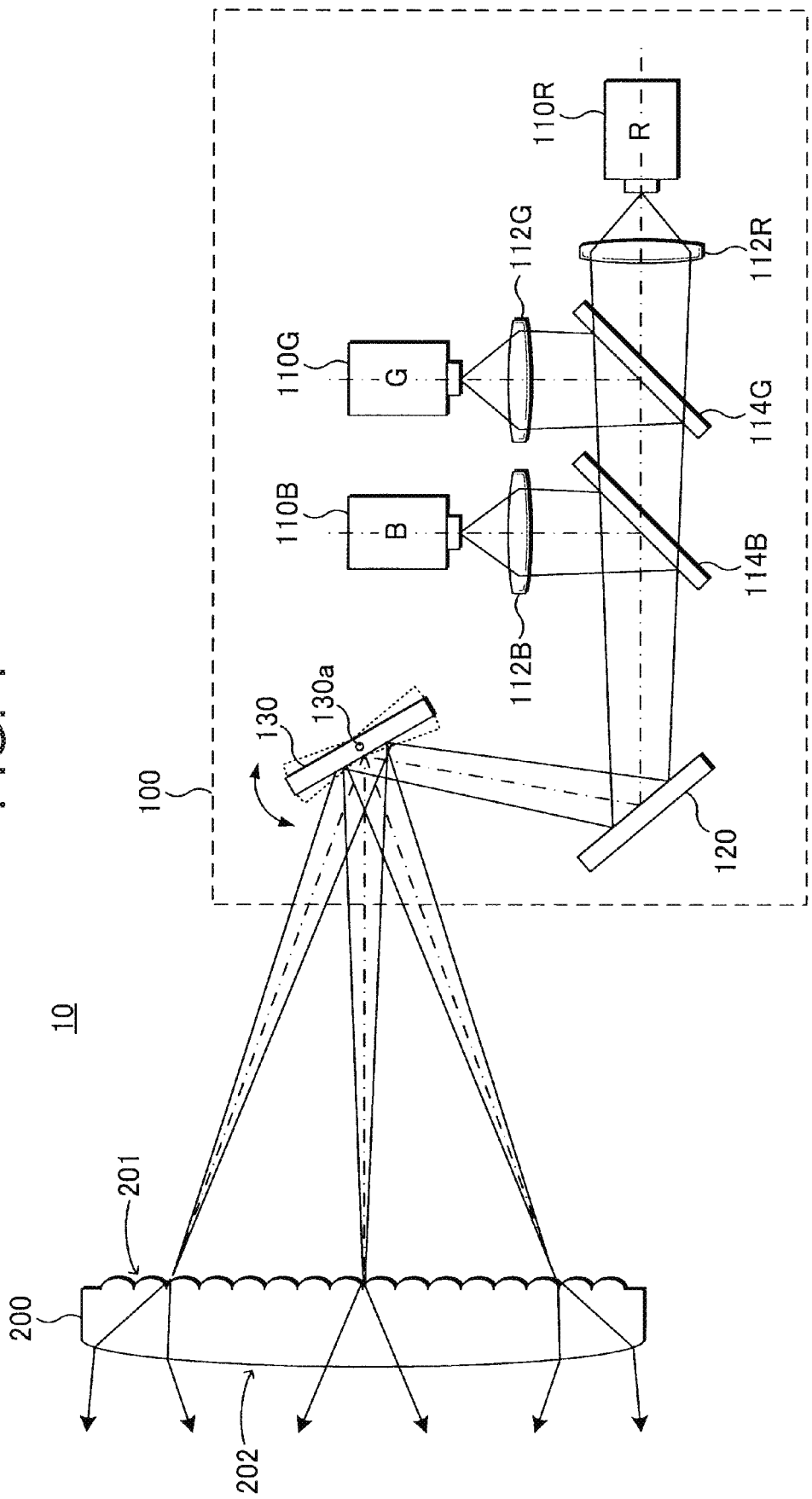
FIG. 1 is a schematic view showing a configuration of a scanning projector system according to the present embodiment.

An embodiment of the present invention will be described in detail with reference to the drawings. FIG. 1 is a schematic view showing a configuration of a scanning projector system 10 according to the present embodiment. The scanning projector system 10 may preferably be used for an in-vehicle head-up display. Of course, it may be applied to other display devices as well. As shown in FIG. 1, the scanning projector system 10 includes a scanning projector 100 and a transmissive screen 200.

The scanning projector 100 includes a red laser light source 110R, a green laser light source 110G and a blue laser light source 110B as light sources, and each light source (110R, 110G and 110B) is subjected to an intensity homogenization and collimation as needed and performs and emits laser light. In addition, emission light from each light source (110R, 110G and 110B) is subjected to brightness modulation in synchronization with scanning in pixel units under control of an image processing device which is not shown.

The respective emitted lights pass through collective lenses (112R, 112G and 112B) arranged on optical axes near the light sources (110R, 110G and 110B), and thereby providing a convergent light. The convergent lights of three R, G and B colors are combined into one convergent light within the scanning projector 100.

In the example shown in FIG. 1, the green convergent light is combined (i.e., multiplexed) with the red convergent light by a dichroic mirror 114G, and further the blue convergent light is combined (i.e., multiplexed) with them by a dichroic mirror 114B into one synthetic light. The combining of the lights into one convergent light may be achieved using other techniques. In addition, focal distance and arrangement position of the respective collective lenses (112R, 112G and 112B) are determined such that the respective convergent lights of the respective colors are focused at the same position.

The synthetic light is bent by a mirror 120 for downsizing, and then an irradiation direction thereof is controlled by a high-speed two-dimensional scanning element 130 to scan the synthetic light in two-dimension. The high-speed two-dimensional scanning element 130 may include a two-dimensional scanning MEMS mirror; however, a vertical scanning MEMS mirror and a horizontal scanning MEMS mirror may be combined and used. Alternatively, a galvanometer mirror may be used as the high-speed two-dimensional scanning element 130.

The MEMS mirror is an optical scanning device produced using a MEMS (Micro Electro Mechanical System) technology, and a movable mirror 130a performs the optical scanning by making reciprocating rotation movement at a predetermined angle around a predetermined rotation axis 130b in a scanning direction. The rotation axis 130b may be defined by a mechanical shaft or may be defined virtually without providing a definite shaft. As the MEMS mirrors, various methods may be employed such as an electromagnetic type moving coil type, an electromagnetic type moving magnet type, an electrostatic type and a piezo type which have been proposed.

The transmissive screen 200 having a rectangular shape is arranged on a light-focusing surface of the synthetic light. The R, G and B synthetic light subjected to brightness modulation per pixel is scanned through the screen 200 at a high speed, thus the two-dimensional image is perceived as a result of an afterimage effect of eyes.

In the present embodiment, the transmissive screen 200 is provided with a microlens array 201 formed on a surface thereof on the side of the scanning projector 100. The microlens array 201 is composed of multiple microlenses. A single lens 202 is formed on an opposite side of the transmissive screen 200. In the shown example, a convex lens is formed as the single lens 202.

According to this configuration, the light entered to the transmissive screen 200 is diffused inside the transmissive screen 200 in a traveling direction corresponding to an incident angle due to the microlens arrays 201 formed on an incident surface. That is, for the light perpendicularly entering to a central portion of the transmissive screen 200, the light is diffused around the perpendicular direction, but as it gets closer to an end portion of the transmissive screen 200, the traveling direction of the diffused light spreads outward.

The traveling direction of the diffused light is changed to more inward as it gets closer to the end portion by a function of the convex lens of the single lens 202 formed on an emission surface when the diffused light is emitted from the transmissive screen 200, thereby an irradiation range is narrowed. That is, the transmissive screen 200 according to this embodiment has functions of both of the conventional transmissive screen 300 and the field lens 310 arranged near the conventional transmissive screen 300. Consequently, there is no need to provide the field lens 310, and the number of components can be reduced.

Figure 2A:
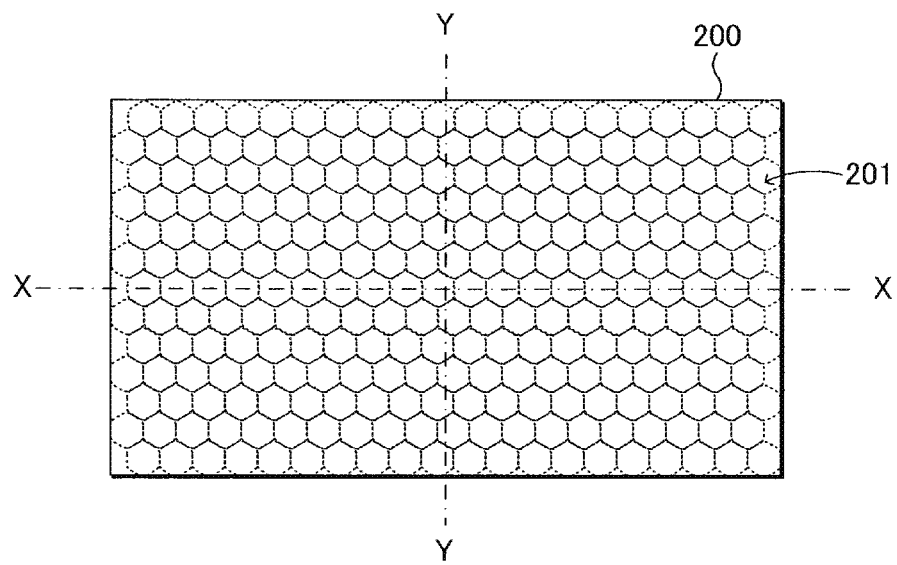
FIGS. 2A, 2B and 2C illustrate a transmissive screen.
Figure 2B:
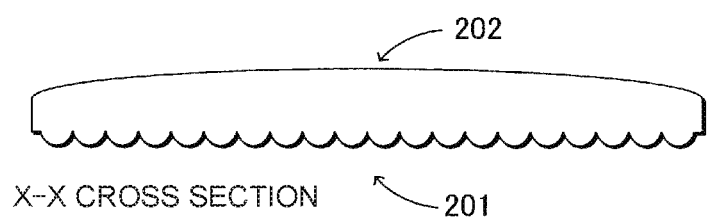
Figure 2C:
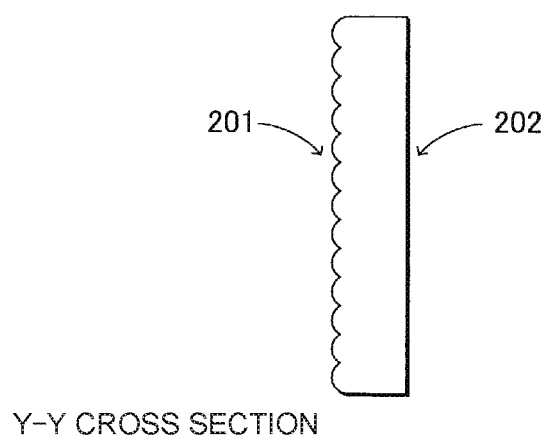

FIG. 2A is an illustration showing the transmissive screen 200 viewed from the incidence surface on which the microlens arrays 201 are formed. Alignment of the microlenses is only an example, and the microlenses may be aligned in accordance with other regularity. FIG. 2B is a cross-sectional view taken along a line X-X in FIG. 2A. The surface on which the convex lens is formed as the single lens 202 is bulged at a central portion. FIG. 2C is a cross-sectional view taken along a line Y-Y in FIG. 2A. In this Y-Y cross-sectional view, the surface on which the convex lens is formed as the single lens 202 is not bulged.

As described above, in this embodiment, the traveling direction of the diffused light is changed at the end portion in a long-side direction, thus the screen 200 is formed into a cylinder shape having the convex surface in the long-side direction. This is because the scan range is wider in the long-side direction than in the short-side direction, and thus the incident angle of the light is greater at the end portion.

To change the traveling direction of the diffused light in the short-side direction, a cylinder shape having the convex surface in the short-side direction is provided. To change the traveling direction of the diffused light in both of the long-side and short-side directions, a toroidal shape having the convex surfaces in the long-side direction and the short-side direction is provided.

Figure 3:
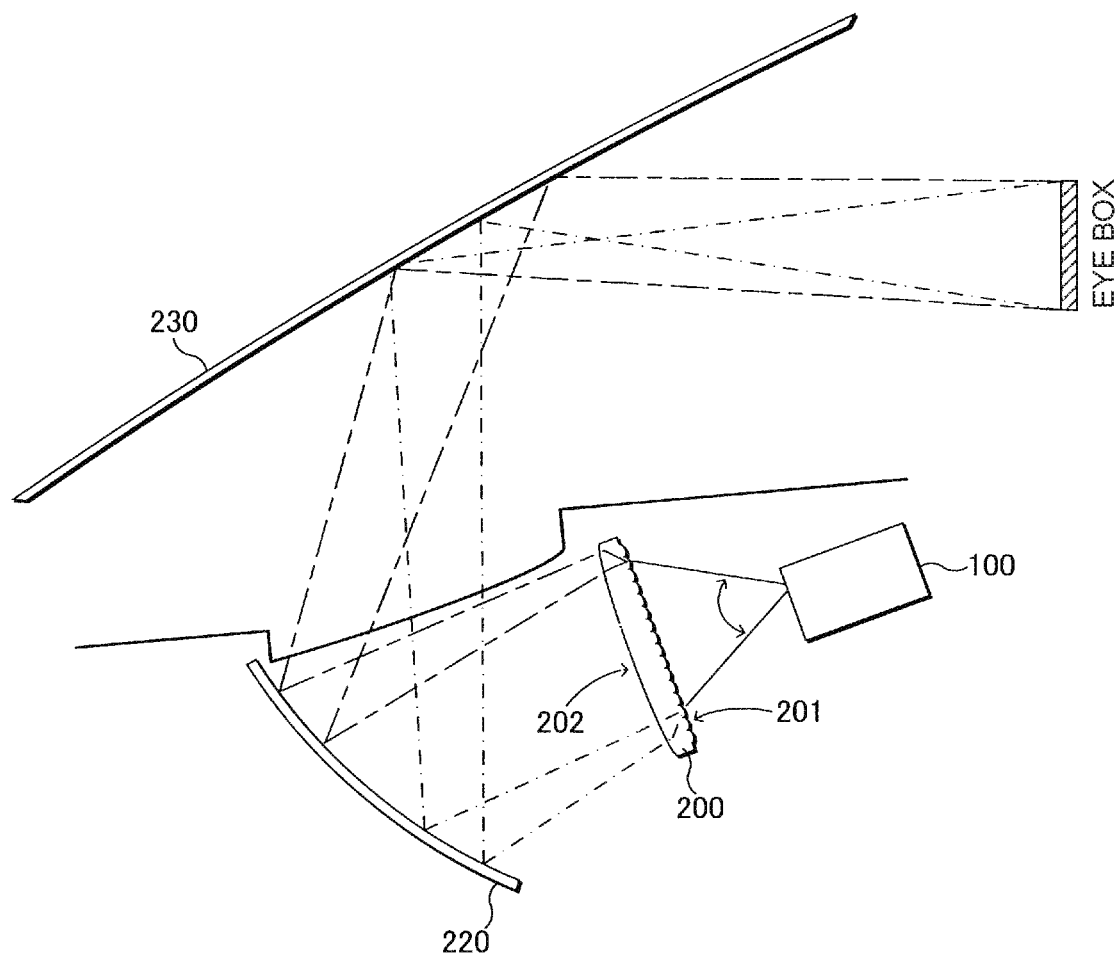
FIG. 3 is a schematic view showing a configuration in case where the scanning projector system according to the present embodiment is applied to an in-vehicle head-up display.

FIG. 3 is a schematic view showing a configuration in which the scanning projector system 10 according to this embodiment is applied to an in-vehicle head-up display. The light entered the transmissive screen 200 by the scanning projector 100 is diffused in the traveling direction corresponding to the incident angle by the microlens arrays 201 formed on the incident surface, but the traveling direction of the diffused light is changed inward as it gets closer to the end portion when being emitted from the screen 200 due to the function of the convex lens of the single lens 202 formed on the emission surface.

An image (i.e., an intermediate image) projected on the transmissive screen 200 in such manner enters a magnifying glass 220, is projected on a windshield 230, and is recognized by driver's eyes located in an eye box.

Light from the end portion of the transmissive screen 200 sufficiently enters the magnifying glass 220, thus the images which are entirely clear can be recognized in the eye box. In this case, a field lens which was conventionally required is no longer required. Consequently, the images which are entirely clear can be obtained without increasing the number of components.

Figure 4A:
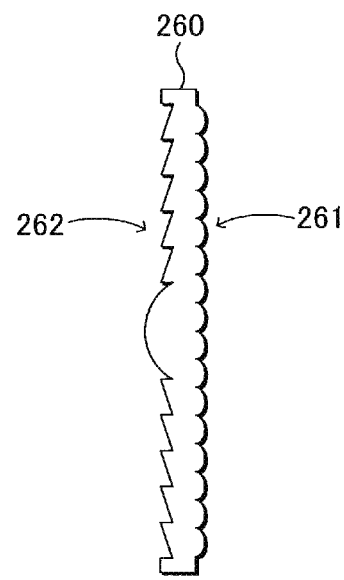
FIGS. 4A and 4B are illustrations of an embodiment in which a Fresnel lens is formed as a single lens to be combined with the transmissive screen.

In addition, the single lens formed on the transmissive screen may be a Fresnel lens. By using the Fresnel lens, the thickness can be thinner, thereby providing further space saving. FIG. 4A illustrates an example of a transmissive screen 260 whose single lens is a Fresnel lens. As shown, the transmissive screen 260 has one surface on which a microlens array 261 is formed, and the other surface on which the Fresnel lens is formed as a single lens 262.

Figure 4B:
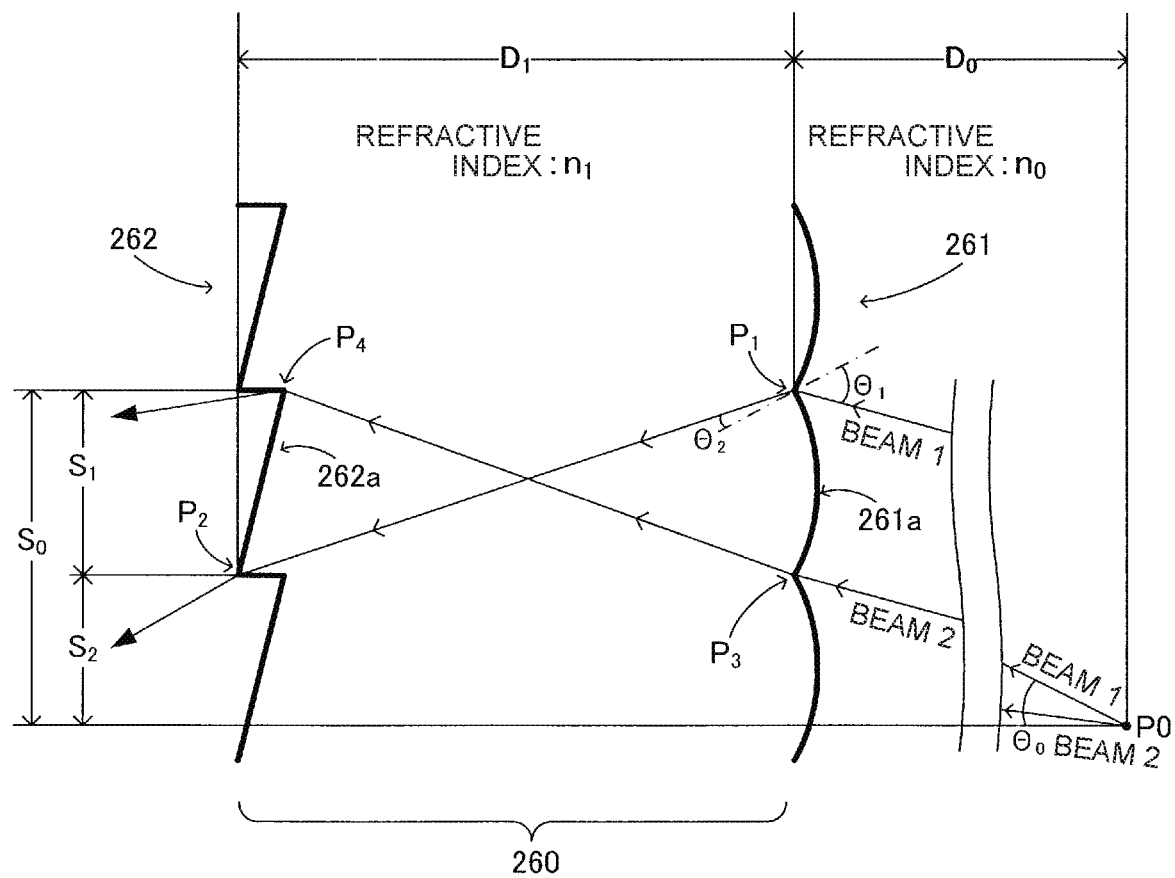

In this case, to prevent a defect in display caused by vertical walls of the Fresnel, it is preferable that a group of beams entered from a given one microlens is emitted from one Fresnel surface. For example, as shown in FIG. 4B, it is preferable that when a group of beams within a beam 1 to a beam 2 emitted with a light source P0 as a rotation axis enters a microlens 261a, then this group of beams is emitted from a Fresnel surface 262a.

Here, if a horizontal distance between the light source P0 and the microlens 261a is $D_0$, a thickness of the transmissive screen 260 is $D_1$, a boundary of the microlens 261a to which the beam 1 enters is $P_1$, a boundary of the Fresnel surface 262a from which the beam 1 is emitted is $P_2$, an emission angle of the beam is $\theta_0$, and an incident angle and an emission angle of the beam onto the microlens 261a are $\theta_1$ (which is known based on a lens radius and a lens pitch) and $\theta_2$, respectively, then, a vertical direction distance $S_0$ between $P_0$ and $P_1$, a vertical direction distance $S_1$ between $P_1$ and $P_2$, and a vertical direction distance $S_2$ between $P_0$ and $P_2$ can be calculated as follows:

$$S_0 = D_0 \tan \theta_0$$

$$S_1 = D_1 \tan \theta_2, \text{ where } \theta_2 = \sin^{-1}((n_1/n_0) \sin \theta_1)$$

$$S_2 = S_0 - S_1.$$

Where, $n_0$ is a refractive index of air, and $n_1$ is a refractive index of a material of the transmissive screen 260.

Positions of $P_3$ and $P_4$ can also be calculated in the same manner. Thus, based on the respective positions of $P_1$, $P_2$, $P_3$ and $P_4$, it is possible to determine a positional relationship between one microlens 261a and the corresponding Fresnel surface 262a.

Figure 5:
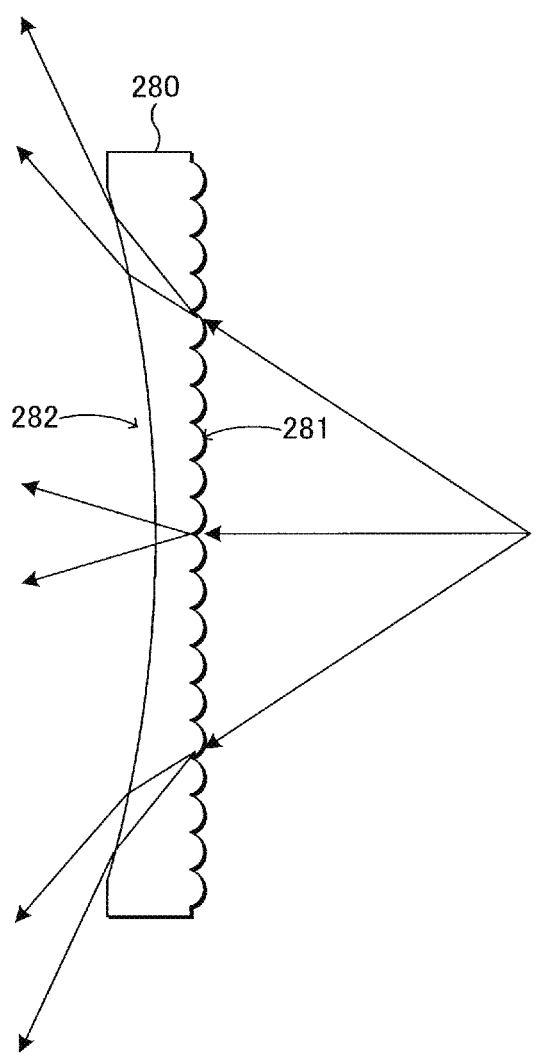
FIG. 5 is an illustration of an embodiment in which a concave lens is combined as a single lens with the transmissive screen.
Figure 6:
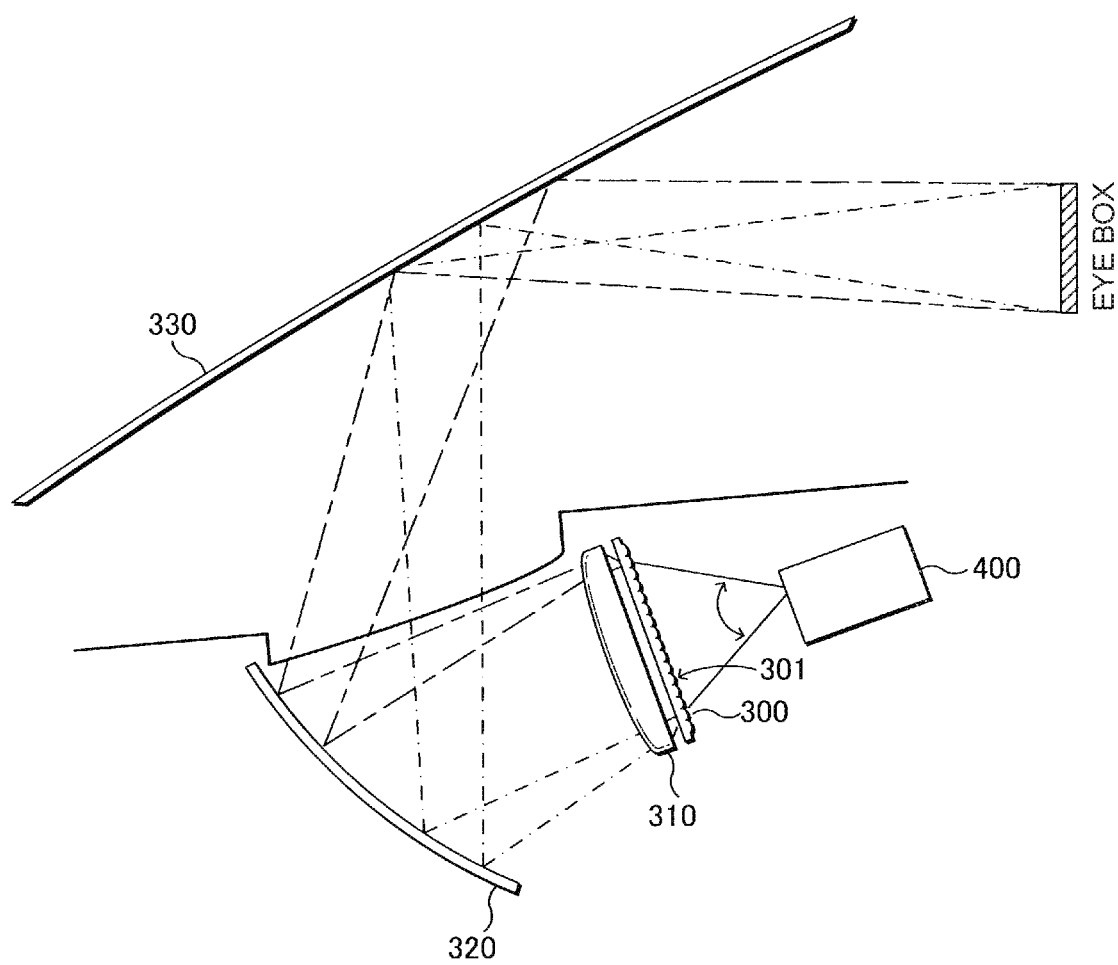
FIG. 6 is a schematic view showing an example of a conventional in-vehicle head-up display using a scanning projector.
Figure 7A:
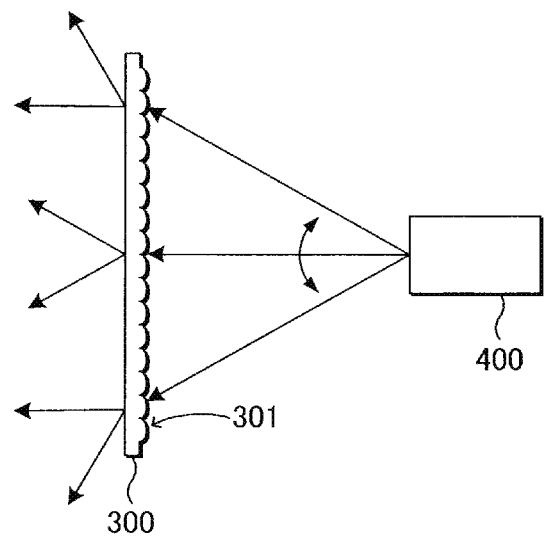
FIGS. 7A and 7B illustrate a function of a field lens.
Figure 7B:
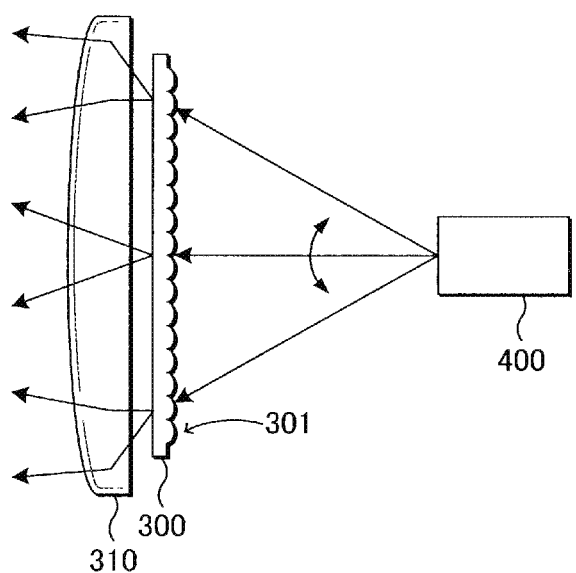

The embodiments of the present invention have been described above. However, the transmissive screen according to the present invention is not limited to the above embodiments, and can be modified in various ways within the scope of the present invention. For example, in the examples shown herein, the convex lens is formed as the single lens at the opposite side of the microlens arrays formation surface. However, as illustrated in FIG. 5, a concave lens may be formed as a single lens 282 on a surface at an opposite side of a surface on which a microlens array 281 of a transmissive screen 280 is formed. In this case, the traveling direction of the diffused light at the end portion is changed to outward. This is effective in case where the light from the light sources is to be irradiated over wide range. Furthermore, the transmissive screen is not limited to a planar shape and may be a curved shape.

REFERENCE SIGNS LIST

10 SCANNING PROJECTOR SYSTEM
100 SCANNING PROJECTOR
110 LASER LIGHT SOURCE
112 COLLECTIVE LENS
114 DICHROIC MIRROR
120 MIRROR
130 TWO-DIMENSIONAL SCANNING ELEMENT
200 TRANSMISSIVE SCREEN
201 MICROLENS ARRAY
202 SINGLE LENS (CONVEX LENS)
220 MAGNIFYING GLASS
230 WINDSHIELD
260 TRANSMISSIVE SCREEN
261 MICROLENS ARRAYS
262 SINGLE LENS (FRESNEL LENS)
280 TRANSMISSIVE SCREEN
281 MICROLENS ARRAYS
282 SINGLE LENS (CONCAVE LENS)

What is claimed is:

1. A scanning projector transmissive screen, comprising:
a first surface on which a microlens array is formed; and
a second surface formed into a single lens shape, wherein the single lens shape forms a concave lens, and wherein light is incident on the first surface and is transmitted through the transmissive screen and emitted from the second surface,
wherein a thickness of an end portion of the transmissive screen is greater than a thickness of a central portion of the transmissive screen.

2. A scanning projector system comprising:
the scanning projector transmissive screen according to claim 1; and
a scanning projector.

* * * * *